US011049034B2

(12) United States Patent
Burchard et al.

(10) Patent No.: US 11,049,034 B2
(45) Date of Patent: Jun. 29, 2021

(54) SYSTEM AND METHOD FOR PERFORMING FAST COMPUTATIONS USING QUANTUM COUNTING BASED ON SIMULTANEOUS SOLUTIONS TO DECISION PROBLEM AND ASSOCIATED HASHING PROBLEM

(71) Applicant: Goldman Sachs & Co. LLC, New York, NY (US)

(72) Inventors: Paul Burchard, Jersey City, NJ (US); Anthony Daoud, El Cajon, CA (US)

(73) Assignee: Goldman Sachs & Co. LLC, New York, NY (US)

( * ) Notice: Subject to any disclaimer, the term of this patent is extended or adjusted under 35 U.S.C. 154(b) by 920 days.

(21) Appl. No.: 15/699,669

(22) Filed: Sep. 8, 2017

(65) Prior Publication Data

US 2018/0096258 A1 Apr. 5, 2018

Related U.S. Application Data

(63) Continuation-in-part of application No. 14/592,876, filed on Jan. 8, 2015, now Pat. No. 10,783,446.

(60) Provisional application No. 61/925,051, filed on Jan. 8, 2014.

(51) Int. Cl.
*G06N 10/00* (2019.01)
*G06F 17/17* (2006.01)
*G06F 1/03* (2006.01)
*H04L 9/06* (2006.01)
*G06N 7/00* (2006.01)

(52) U.S. Cl.
CPC .......... *G06N 10/00* (2019.01); *G06F 1/0307* (2013.01); *G06F 17/17* (2013.01); *G06N 7/005* (2013.01); *H04L 9/0643* (2013.01)

(58) Field of Classification Search
CPC combination set(s) only.
See application file for complete search history.

(56) References Cited

U.S. PATENT DOCUMENTS

| 7,113,967 B2 | 9/2006 | Cleve | |
| 2005/0133780 A1* | 6/2005 | Azuma | B82Y 10/00 |
| | | | 257/13 |
| 2008/0140749 A1 | 6/2008 | Amato et al. | |
| 2009/0164435 A1 | 6/2009 | Routt | |

(Continued)

OTHER PUBLICATIONS

Ablayev et al. "Quantum Hashing", arXiv, 2013, pp. 11.*

(Continued)

*Primary Examiner* — Li Wu Chang

(57) ABSTRACT

A method is provided for solving a computational problem that is reducible to a problem of counting solutions to an associated decision problem. The method includes estimating a number of the solutions to the decision problem using a quantum computer by determining if there is at least one simultaneous solution to both (i) the decision problem and (ii) an associated hashing problem. The method also includes increasing a precision of the estimated number of the solutions to the decision problem using the quantum computer by determining if there are multiple solutions to the decision problem that are simultaneously solutions to the associated hashing problem. The method further includes outputting or using the estimated number of the solutions to the decision problem as a solution to the computational problem.

20 Claims, 4 Drawing Sheets

(56) References Cited

U.S. PATENT DOCUMENTS

| | | |
|---|---|---|
| 2015/0081565 A1 | 3/2015 | Roullier et al. |
| 2017/0286858 A1 | 10/2017 | La Cour et al. |
| 2017/0364796 A1* | 12/2017 | Wiebe .................. G06N 3/0445 |
| 2018/0189653 A1 | 7/2018 | Burchard |
| 2019/0129916 A1 | 5/2019 | Hidaka |

OTHER PUBLICATIONS

Applebaum et al., "Low-Complexity Cryptographic Flash Functions," 8th Innovations in Theoretical Computer Science (ITCS), 2017, 31 pages.

Brassard et al., "Quantum Counting," arXiv.org, arXiv:quant-ph/9805082v1, May 27, 1998, 12 pages.

Ermon et al., "Optimization with Parity Constraints: From Binary Codes to Discrete Integration," UAI'13 Proceedings of the Twenty-Ninth Conference on Uncertainty in Artificial Intelligence, Aug. 2013, 10 pages.

Nachtergaele, "Quantum Spin Systems," arXiv.org, arXiv:math-ph/0409006v1, Sep. 2, 2004, 10 pages.

Rotteler et al., "A quantum circuit to find discrete logarithms on ordinary binary elliptic curves in depth O(log2n)," arXiv.org, arXiv:1306.1161v2 [quant-ph], Nov. 14, 2013, 13 pages.

Shaltiel et al., "Pseudorandomness for Approximate Counting and Sampling," Electronic Colloquium on computational Complexity, Report No. 86, 2004, ISSN 1433-8092, 24 pages.

Rjlipton, "Stockmeyer's Approximate Counting Method," Gödel's Lost Letter and P=NP blog post, Aug. 27, 2009, 11 pages.

Thompson et al., "Quantum computing with black-box subroutines," arXiv.org, arXiv:1310.2927v5 [quant-ph], Nov. 21, 2013, 8 pages.

Burchard, "Quantum Solver for Financial Calculations", U.S. Appl. No. 14/592,876, filed Jan. 8, 2015.

Abrams et al., "Nonlinear quantum mechanics implies polynomial-time solution for NP-complete and #P problems", Physical Review Letters 81.18, 1998, 10 pages.

Bernstein, "Cost analysis of hash collisions: Will quantum computers make SHARCS obsolete?", SHARC'09 Special purpose Hardware for Attacking Cryptographics Systems, 2009, 12 pages.

Valiant et al., "NP is as easy as detecting unique solutions", Theoretical Computer Science 47, 1986, p. 85-93.

Aaronson, "NP-complete Problems and Physical Reality", ACM Sigact News 36.1, 2005, 23 pages.

Kutzhov, "New upper bound for the #3-SAT Problem", Science Direct, Nov. 18, 2006, 5 pages.

Stockmeyer, On Approximation Algorithms for #P, Siam Journal on Computing, 14(4), Nov. 1985, pp. 1-13.

Boyer et al., "Tight bounds on quantum searching", PhysComp96, May 1996, 8 pages.

Diao et al., "Quantum Counting: Algorithm and Error Distribution", Acta Applicandae Mathematicae, vol. 118, No. 1, Feb. 2012, pp. 147-159.

Liu et al., "A Parallel Quantum Algorithm for the Satisfiability Problem", Communications in Theoretical Physics, vol. 49, No. 3, Mar. 2008, pp. 629-630.

Long et al., "Search an unsorted database with quantum mechanics", Frontiers of Computer Science in China, vol. 1, No. 3, Jul. 2007, pp. 247-271.

Long, "Grover Algorithm with zero theoretical failure rate", Cornell University Library, Jun. 2001, 5 pages.

International Search Report dated May 22, 2019 in connection with International Patent Application No. PCT/US2019/017974, 4 pages.

Written Opinion of the International Searching Authority dated May 22, 2019 in connection with International Patent Application No. PCT/US2019/017974, 10 pages.

Florio et al., "Quantum Implementation of Elementary Arithmetic Operations"; https://arxiv.org/abs/quant-ph/0403048; submitted on Mar. 5, 2004; 11 pages.

Grover et al., "Is Partial Quantum Search of a Database Any Easier?"; https://arxiv.org/abs/quant-ph/0407122v4; submitted on Feb. 7, 2005; 15 pages.

Hoyer et al., "Lower Bounds on Quantum Query Complexity"; https://arxiv.org/abs/quant-ph/0509153v1; submitted on Sep. 21, 2005; 23 pages.

Hasegawa et al., "Theoretical Analyses of Quantum Counting against Decoherence Errors", Mar. 2005, 22 pages.

Fischlin et al., "Security-Amplifying Combiners for Collision-Resistant Hash Functions", Annual International Cryptology Conference, 2007, 18 pages.

Brassard et al., "An optimal quantum algorithm to approximate the mean and its application for approximating the median of a set of points over an arbitrary distance", May 2011, 10 pages.

Montanaro, "Quantum speedup of Monte Carlo methods", Jul. 2017, 28 pages.

Brassard et al., "Quantum Amplitude Amplification and Estimation", May 2000, 32 pages.

Montanaro, "Quantum speedup of Monte Carlo methods", The Royal Society Publishing, May 2015, 20 pages.

Heinrich, "Quantum Summation with an Application to Integration", May 2001, 48 pages.

Grover et al., "Quantum search for multiple items using parallel queries", Jul. 2004, 6 pages.

Zalka, "Grover's quantum searching algorithm is optimal", Dec. 1999, 13 pages.

Office Action dated Aug. 3, 2020 in connection with U.S. Appl. No. 16/275,618, 23 pages.

Office Action dated May 7, 2021 in connection with U.S. Appl. No. 15/906,217, 8 pages.

* cited by examiner

US 11,049,034 B2

SYSTEM AND METHOD FOR PERFORMING FAST COMPUTATIONS USING QUANTUM COUNTING BASED ON SIMULTANEOUS SOLUTIONS TO DECISION PROBLEM AND ASSOCIATED HASHING PROBLEM

CROSS-REFERENCE TO RELATED APPLICATIONS AND PRIORITY CLAIM

This application is a continuation-in-part of U.S. patent application Ser. No. 14/592,876 filed on Jan. 8, 2015, which claims priority under 35 U.S.C. § 119(e) to U.S. Provisional Patent Application No. 61/925,051 filed on Jan. 8, 2014. Both of these applications are hereby incorporated by reference in their entirety.

TECHNICAL FIELD

This disclosure generally relates to quantum computing systems. More specifically, this disclosure relates to a system and method for performing fast computations using quantum counting.

BACKGROUND

Many important or useful computations can be expressed as counting problems. For example, Monte Carlo simulations are used in a large number of applications. In its simplest form, a Monte Carlo simulation attempts to count the size of a set by randomly sampling from a given space and seeing which samples fall within or "hit" the set. More generally, a Monte Carlo simulation attempts to compute the integral of a function over a given space, which can be reformulated as counting the size of a set underneath a graph of the function.

Monte Carlo simulation is a very general and robust technique. However, the error of the solution computed using a Monte Carlo simulation decays at a rate of $\sqrt{N}$, where N denotes the amount of work performed in the simulation. "Quasi" Monte Carlo techniques have been developed in which the error of the solution eventually decays at a rate of around $1/N$. Unfortunately, quasi Monte Carlo techniques suffer from a penalty equivalent to $(\log N)^D$, where D denotes the number of dimensions of the given space. Thus, quasi Monte Carlo techniques are practical only for very low dimensional spaces.

SUMMARY

This disclosure provides a system and method for performing fast computations using quantum counting.

In a first embodiment, a method is provided for solving a computational problem that is reducible to a problem of counting solutions to an associated decision problem. The method includes, using a quantum computer, estimating a number of the solutions to the decision problem by determining if there is at least one simultaneous solution to both (i) the decision problem and (ii) an associated hashing problem. The method also includes, using the quantum computer, increasing a precision of the estimated number of the solutions to the decision problem by determining if there are multiple solutions to the decision problem that are simultaneously solutions to the associated hashing problem. The method further includes outputting or using the estimated number of the solutions to the decision problem as a solution to the computational problem.

In a second embodiment, an apparatus includes a quantum computer having at least one quantum circuit. To solve a computational problem that is reducible to a problem of counting solutions to an associated decision problem, the quantum computer is configured to determine, using the at least one quantum circuit, if there is at least one simultaneous solution to both (i) the decision problem and (ii) an associated hashing problem in order to estimate a number of the solutions to the decision problem. The quantum computer is also configured to determine, using the at least one quantum circuit, if there are multiple solutions to the decision problem that are simultaneously solutions to the associated hashing problem in order to increase a precision of the estimated number of the solutions to the decision problem. The estimated number of the solutions to the decision problem represents a solution to the computational problem.

In a third embodiment, a system includes a quantum computer having at least one quantum circuit and a classical computer having at least one processor configured to execute instructions stored in at least one memory. To solve a computational problem that is reducible to a problem of counting solutions to an associated decision problem, the classical computer is configured to use the quantum computer to estimate a number of the solutions to the decision problem by determining if there is at least one simultaneous solution to both (i) the decision problem and (ii) an associated hashing problem. The classical computer is also configured to use the quantum computer to increase a precision of the estimated number of the solutions to the decision problem by determining if there are multiple solutions to the decision problem that are simultaneously solutions to the associated hashing problem. The estimated number of the solutions to the decision problem represents a solution to the computational problem.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
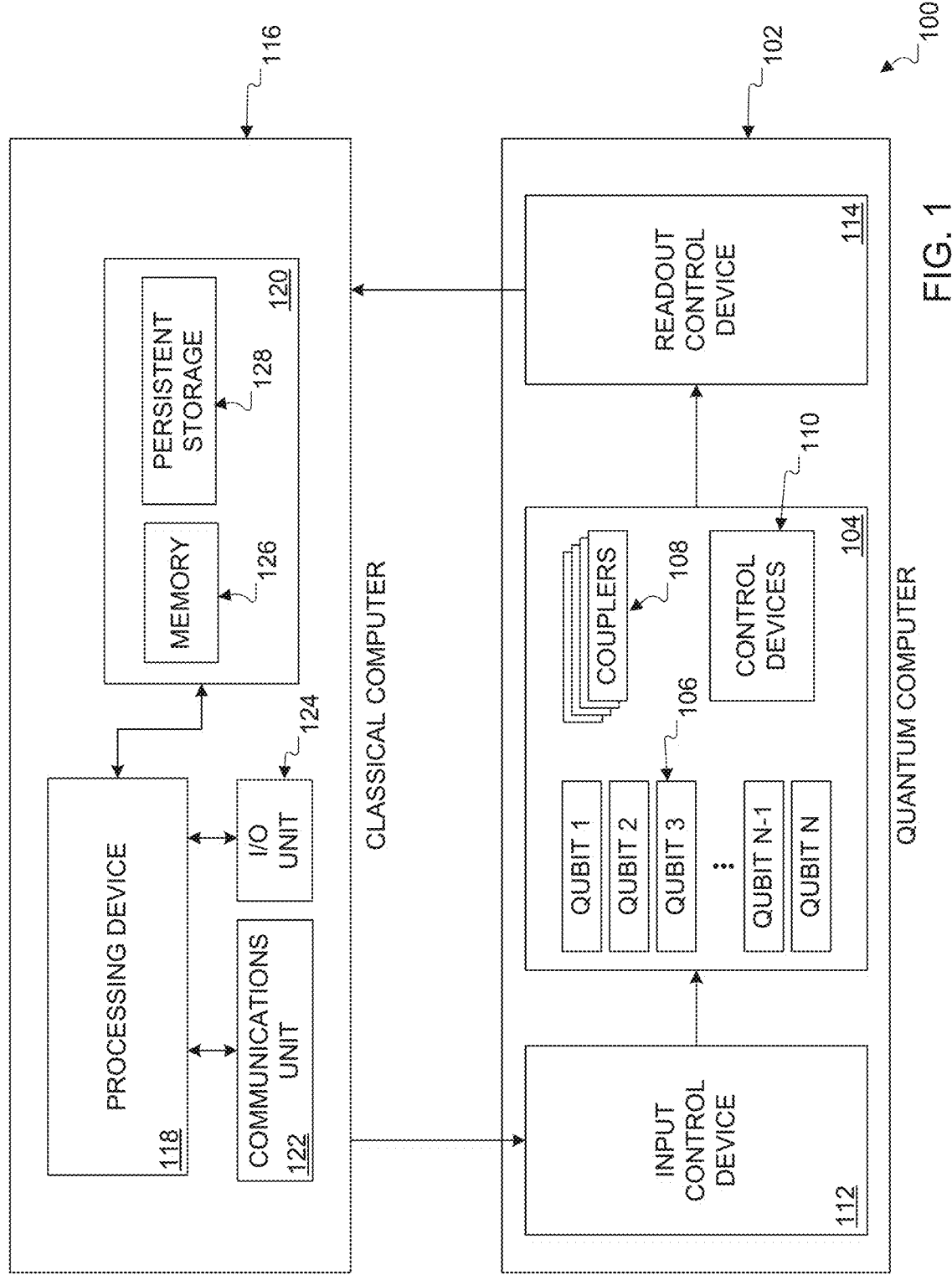
FIG. 1 illustrates an example system for performing fast computations using quantum counting according to this disclosure.

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, many important or useful computations (such as Monte Carlo simulations) can be thought of or implemented as counting problems. This disclosure provides techniques for fast computations on quantum computing hardware using quantum counting. A quantum computer is a computational device that uses quantum mechanics, and quantum computing exploits quantum mechanical phenomena (such as superposition and entanglement) to perform operations on data. A quantum computer is fundamentally different from a classical computer. A classical computer is a two-state system that is characterized by the use of multiple bits, each of which can only have one of two values (a "0" or a "1"). In contrast, a quantum computer can exist in a superposition of states. The building block of a quantum computer is a quantum bit or "qubit," and each qubit can represent a "1," a "0," or any superposition of the two states. In general, an n-qubit quantum computer can exist in any superposition of $2^n$ states simultaneously, while an n-bit classical computer can exist in only one of the $2^n$ states at a given time.

In accordance with this disclosure, quantum computing hardware is used to perform quantum counting to solve various classes of calculations, such as averages, integrations, volumes, and percentiles. This is accomplished by reducing a calculation to a counting problem and solving the counting problem efficiently using the quantum computing hardware. As described below, a count can be estimated by checking if there is an element of a set being counted that has a specific hash value. This is performed using a hash function that is easily inverted by a quantum computer but not a classical computer. Efficiency is achieved by N-fold amplification, such as by finding N elements of the set being counted, which when combined achieve a specific hash value (where N>1 and possibly where N>>1).

Note that various models of quantum computing exist, where different quantum computing models correspond to different ways of exploiting superposition and entanglement of quantum mechanics. For example, "gate model" quantum computers apply a sequence of unitary "gate" operators to a prepared quantum system before making a quantum measurement. "Annealing model" quantum computers gradually freeze a quantum system into a low energy state, allowing quantum tunneling to occur during the process. "Topological" quantum computers use qubits in topologically-constrained states that are less sensitive to noise. In the following description, one or more specific quantum computing models may be described as being used to perform fast computations using quantum counting. However, any suitable quantum computing model (now known or later developed) could be used to support fast computations using quantum counting as described in this disclosure.

FIG. 1 illustrates an example system 100 for performing fast computations using quantum counting according to this disclosure. As shown in FIG. 1, the system 100 implements or includes a quantum computing system 102, which includes at least one quantum circuit 104. In this example, each quantum circuit 104 includes or operates using multiple qubits 106 and multiple couplers 108 that provide connectivity between the qubits 106. Each quantum circuit 104 also includes one or more control devices 110 that can affect the qubits 106.

Each qubit 106 denotes any suitable structure configured to implement a quantum bit. Any suitable physical implementations of the qubits 106 (now known or later developed) could be used, such as those that use photons, atoms, ions, atomic nuclei, electrons, optical lattices, Josephson junctions, or quantum dots. Each coupler 108 denotes any suitable structure configured to facilitate interactions between qubits. Any suitable physical implementations of the couplers 108 (now known or later developed) could be used, including those that allow interactions between two qubits 106 and those that allow interactions between more than two qubits 106. Each control device 110 denotes any suitable structure configured to change a state or other characteristic of one or more qubits. Any suitable physical implementations of the control devices 110 (now known or later developed) could be used, such as those that can alter the states of photons, atoms, ions, atomic nuclei, electrons, optical lattices, Josephson junctions, or quantum dots. In some embodiments, the control devices 110 can generate magnetic fields to alter the qubits 106.

In some embodiments, the quantum computing system 102 can include at least one input control device 112 and at least one readout control device 114 that facilitate input/output communications between the quantum computing system 102 and a classical computing system 116. For example, the input control device 112 could receive input data defining a type of problem to be solved or data associated with the problem to be solved, and the readout control device 114 could facilitate read-out of the qubits 106 after the qubits 106 have settled to their lowest energy states. Each control device 112, 114 includes any suitable structure facilitating interactions with an external computing device or system.

In this example, the classical computing system 116 includes at least one processing device 118, at least one storage device 120, at least one communications unit 122, and at least one input/output (I/O) unit 124. The processing device 118 executes instructions that may be loaded into a memory 126. The processing device 118 includes any suitable number(s) and type(s) of processors or other devices in any suitable arrangement. Example types of processing devices 118 include microprocessors, microcontrollers, digital signal processors, field programmable gate arrays, application specific integrated circuits, and discrete circuitry.

The memory device 126 and a persistent storage 128 are examples of storage devices 120, which represent any structure(s) capable of storing and facilitating retrieval of information (such as data, program code, and/or other suitable information on a temporary or permanent basis). The memory device 126 may represent a random access memory or any other suitable volatile or non-volatile storage device(s). The persistent storage 128 may contain one or more components or devices supporting longer-term storage of data, such as a read only memory, hard drive, Flash memory, or optical disc.

The communications unit 122 represents an interface that supports communications with other systems or devices. For example, the communications unit 122 could include a network interface card or a wireless transceiver facilitating communications over a wired or wireless network. The communications unit 122 may support communications through any suitable physical or wireless communication link(s).

The I/O unit 124 allows for input and output of data. For example, the I/O unit 124 may provide a connection for user input through a keyboard, mouse, keypad, touchscreen, or other suitable input device. The I/O unit 124 may also send output to a display, printer, or other suitable output device.

In some embodiments, pre-processing and/or post-processing can be handled by components of the classical computing system 116, while the quantum computing system 102 handles fast computations using quantum counting as described this patent document. In other embodiments, the quantum computing system 102 operates as a standalone device (without a classical computing system 116) and performs fast computations using quantum counting as described this patent document. When implemented as a standalone device, the quantum computing system 102 may or may not be networked with or otherwise connected to other machines. In a networked deployment, the quantum computing system 102 may operate in the capacity of a server or a client machine in a client-server network environment or as a peer machine in a peer-to-peer or distributed network environment.

Although FIG. 1 illustrates one example of a system 100 for performing fast computations using quantum counting, various changes may be made to FIG. 1. For example, while shown as being separate systems, various components of the quantum computing system 102 and the classical computing system 116 could be combined into a single apparatus or system. As a particular example, one, some, or all of the components of the classical computing system 116 could be used in the quantum computing system 102. This may allow, for instance, the quantum computing system 102 to transmit/receive data over at least one network via the communications unit(s) 122 or to transmit/receive I/O data via the I/O unit(s) 124.

Figure 2:
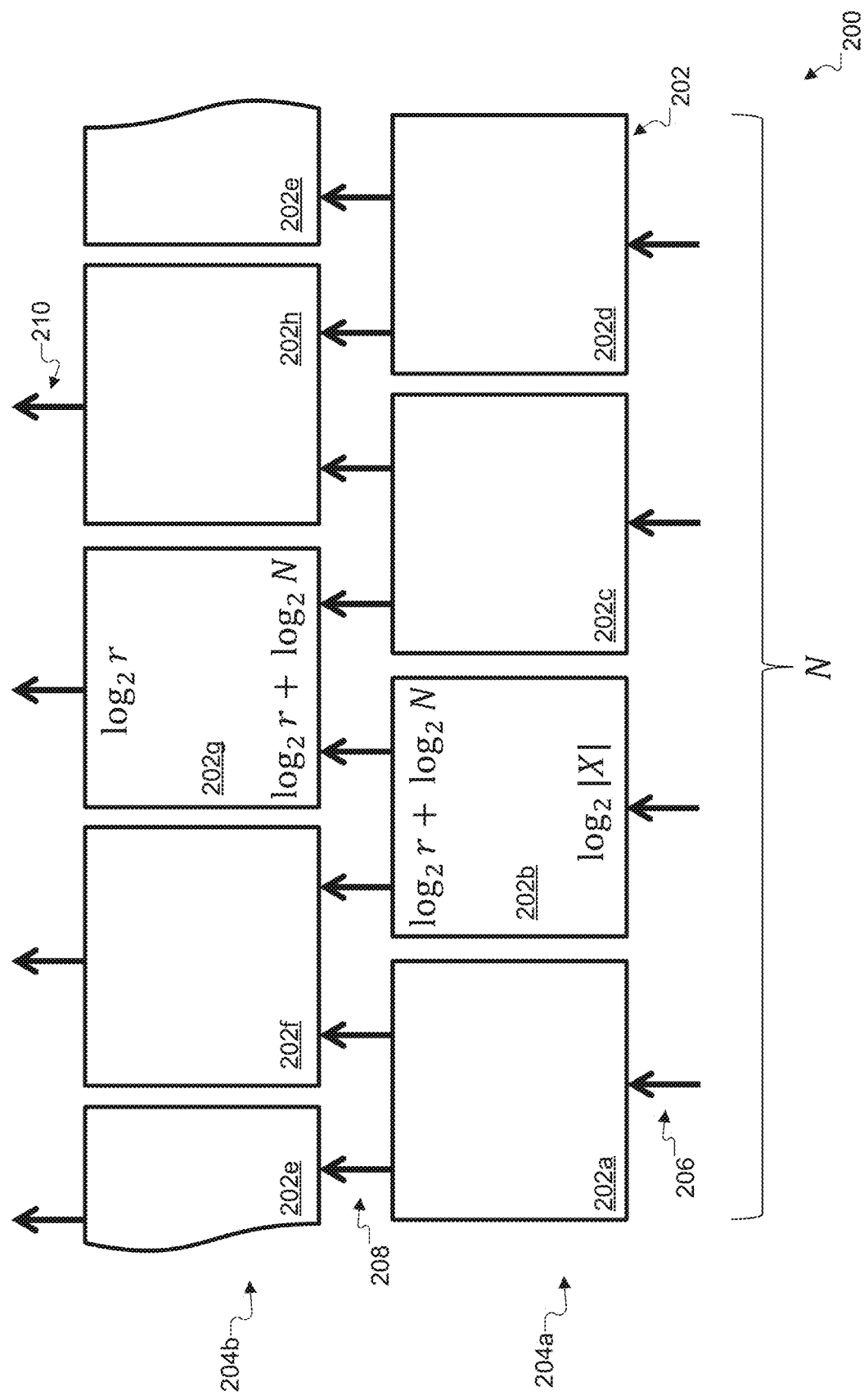
FIGS. 2 and 3 illustrate an example technique for computing composite hash values during quantum counting and associated results according to this disclosure.
Figure 3:
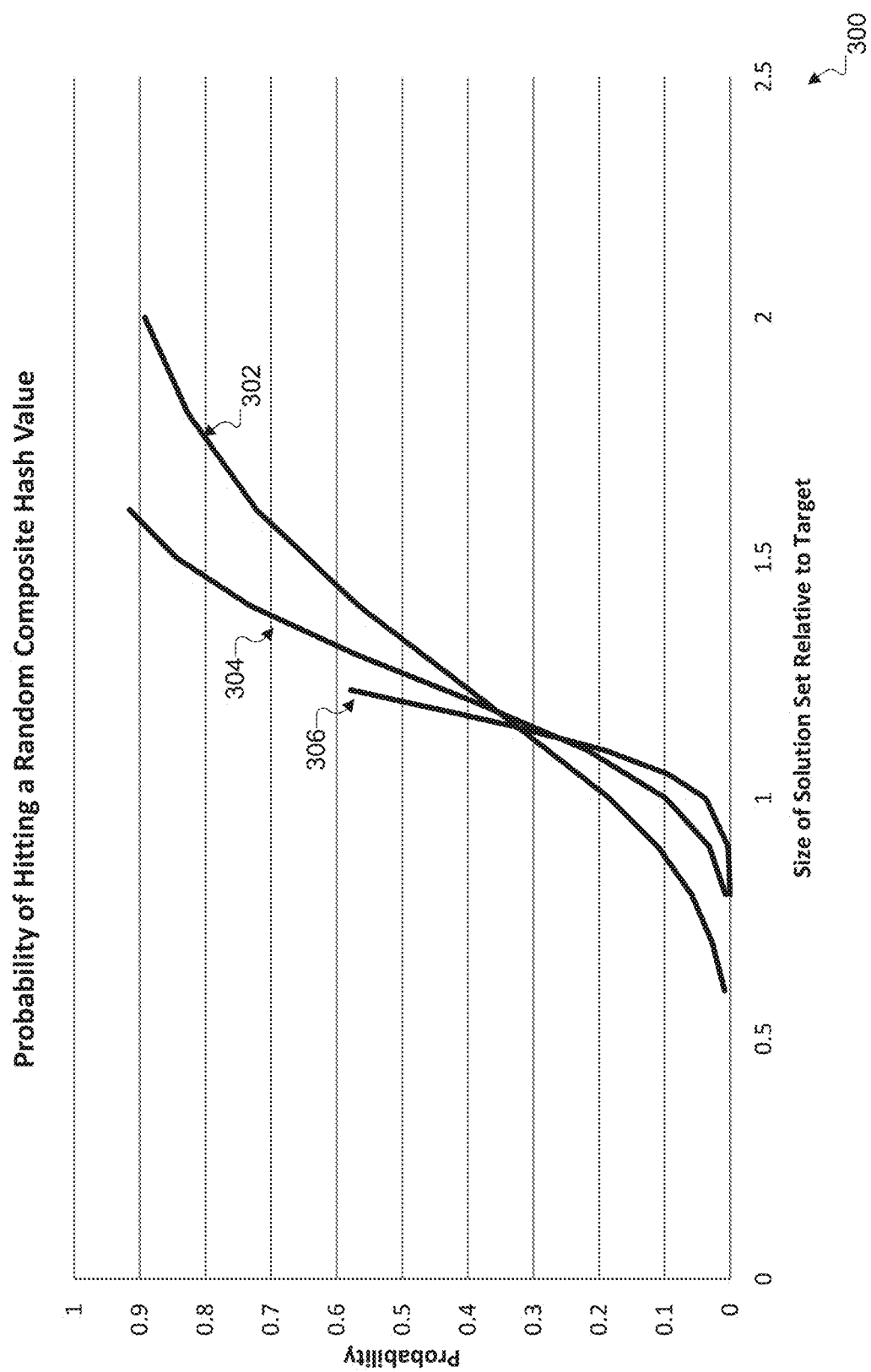

FIGS. 2 and 3 illustrate an example technique for computing composite hash values during quantum counting and associated results according to this disclosure. In particular, FIG. 2 illustrates an example circuit 200 for computing a composite hash value during quantum counting, and FIG. 3 contains an example chart 300 illustrating simulation results associated with a composite hash function.

As noted above, various computations can be implemented as counting problems, and these computations can be performed quickly using quantum counting on quantum computing hardware (which may be referred to as a "quantum counter"). A quantum counter could be used in a variety of applications. For example, a quantum counter could be used to solve the following three general classes of calculations (namely because all of these classes of calculations can be translated into corresponding counting problems):

(1) Tail calculations: Over a large set of inputs x, find the $p^{th}$ percentile value of $f(x)$.

(2) Integration calculations: Over a large set of inputs x, find the sum or average of $f(x)$.

(3) American integration calculations: Over a large set of inputs $x=(x_1, \ldots, x_d)$, find the iterated average p( ), where inductively $p(x_1, \ldots, x_d)=f(x_1, x_d; \text{average}_{x_{d+1}} p(x_1, \ldots, x_{d+1}))$ for some $f$.

For problem class (1) above, the calculation can be reduced to a problem of counting x such that $f(x)<c$ and then performing a binary search for the correct value of c.

For problem class (2) above, the calculation of the average of $f(x)$ can be turned into a problem of counting points under a graph of $f$. In more detail, it can be assumed, without a loss of generality, that $f(x)$ takes values in non-negative integers y with d bits (enough for the desired accuracy). Up to further scaling, the average to be computed is the sum of this $f(x)$ over all x having D bits. This sum amounts to counting the solutions to the following problem: consider strings (x, y) of D+d bits and declare such an (x, y) to be in the set to be counted if $y<f(x)$.

For problem class (3) above, the conditional average $a(x_1, \ldots, x_d)=\text{average}_{x_{d+1}} p(x_1, \ldots, x_{d+1})$ is represented as the least squares best fit of some chosen functional forms, $a(x_1, \ldots, x_d)=\Sigma_i c_i p_i(x_1, \ldots, x_{d+1})$, resulting in the inductive conclusion that $p(x_1, \ldots, x_d)=f(x_1, \ldots, x_d; \Sigma_i c_i p_i(x_1, \ldots, x_d))$ once the $c_i$ values have been determined. To determine the $c_i$ values, the solution of the least squares best fit involves the calculation of the averages of the functions $p(x_1, \ldots, x_{d+1})p_i(x_1, \ldots, x_d)$ and $p_i(x_1, \ldots, x_d)p_j(x_1, \ldots, x_d)$ over all truncated inputs $(x_1, \ldots, x_{d+1})$. These function averages can be computed in the same manner as in problem class (2) above.

Quantum computers are more naturally suited for decision problems (finding a solution) rather than counting problems (finding out how many solutions there are). In this document, an NP (non-deterministic polynomial time) class of problems denotes problems whose solutions can be verified quickly by a deterministic machine in polynomial time. Also, a #P class of problems denotes problems that count the number of solutions to a decision problem in the NP class. The #P class is clearly at least as difficult to solve as the NP class and is conjecturally harder to solve. Classical computing systems generally require exponential time to solve NP problems and an even greater exponential time to solve #P problems.

To enable a quantum computer to count solutions in order to solve a #P problem (which is related to an NP decision problem), this disclosure provides techniques based on solving a hashing problem, which involves solutions to a decision problem. The precision of the solution count is amplified or improved by solving the same hashing problem for a number of such decision problems.

To allow a quantum computer to count efficiently, it cannot be assumed that all problems in the NP class can be solved efficiently, as this may not be possible even for quantum computers. Instead, a hash function is chosen, where the hash function is easy for a quantum computer to solve but hard for a classical computer to solve. The classical hardness of the hash function helps to ensure that the hash function is effectively random relative to the solutions of the NP decision problem. For example, it is known that the discrete logarithm problem can be solved easily on a quantum computer but is believed to be exponentially hard on a classical computer.

In order to provide an estimate of the size of a solution set, the quantum counter uses the hash function to determine whether there exists a solution that achieves a specific random hash value, possibly while adding random "salt" (a random value) into the input of the hash function. This makes more efficient use of a constrained quantum circuit size but can require that the hash function take on its effectively random values with equal probability. A small sample of "yes" or "no" answers to the question of whether a solution exists that achieves a specific random hash value can be used to obtain an estimate of the solution set size. For example, if (i) the solution set to the decision problem is S, (ii) the set of distinct hash values is R, and (iii) choosing two random hash values (and possibly salt) yields one hit on S and one non-hit on S, the posterior probability distribution for the size |S| of the solution set is proportional to $(1-\exp(-|S|/|R|))\times\exp(-|S|/|R|)$. This distribution provides confidence intervals for |S| at any specified probability level.

Thus, in some embodiments, an assumption can be made that the sizes of the solution set and set of distinct hash values are comparable. This allows one to obtain the most resolution from a hit or non-hit onto a chosen hash value. A binary search can be used to efficiently reach the parameters that make this assumption true and yield the most resolution.

After that, the quantum counter accomplishes amplification by solving the hashing problem for a sequence of N solutions to the decision problem (instead of using a single solution). This provides an estimate whose confidence interval shrinks as 1/N. This is because a given confidence interval for the size $|S^N|=|S|^N$ of the product set provides a confidence interval of 1/N for the size for |S|. One possible goal of the disclosed techniques is to achieve this 1/N convergence with quantum computing resources (measured in qubits and/or time) proportional only to N or nearly N, instead of the Monte Carlo requirement of $N^2$ for classical computing. Thus, another requirement could be that the hash function can be implemented in a quantum circuit of size linear or nearly linear in N.

Suppose a hash function meeting the first two requirements is constructed so that (i) the hash function is hard for classical computers to solve but easy for quantum computers to solve and (ii) its values are substantially equally distributed, with arbitrary input and output sizes up to some discretization. From this, it is possible to construct a composite hash function meeting the third requirement of having a linear or nearly linear size circuit using the original hash function as a component.

FIG. 2 illustrates an example circuit 200 for computing a composite hash value. As shown in FIG. 2, the circuit 200 includes multiple quantum circuits 202, including quantum circuits 202a-202h. In some embodiments, each of the quantum circuits 202 could be implemented using the same design as the quantum circuit 104 shown in FIG. 1. However, other embodiments of the quantum circuits 202 could be used. In general, any suitable circuits implementing a quantum computing model could be used here.

The quantum circuits 202 are arranged in multiple levels in FIG. 2, namely a lower level 204a and an upper level 204b. In the illustrated example, the lower level 204a includes quantum circuits 202a-202d, and the upper level 204b includes quantum circuits 202e-202h. However, each level 204a and 204b could include any number of quantum circuits. In some embodiments, each level 204a and 204b includes N quantum circuits. Note that the quantum circuit 202e is shown here in divided form for reasons discussed below. Also, the outputs of the quantum circuits in the lower level 204a undergo a permutation (in this example a shift) before being provided to the quantum circuits in the upper level 204b.

The circuit 200 in FIG. 2 can be used to implement a quantum counter, in which case the circuit 200 can be configured as follows. Let X denote an input set of an associated NP decision problem, and let r denote an estimate of the size of the solution set S so that $r^N$ is an estimate of the size of the product set $S^N$ of sequences of N solutions to the decision problem. Start with a sequence of N inputs 206 from X, where each input 206 includes or is associated with approximately $\log_2|X|$ qubits.

The quantum circuits 202a-202d apply a composite hash function to the inputs 206 of X. This produces intermediate hash values with approximately N×r possible values for each element, and each hash value includes or is associated with approximately ($\log_2 r + \log_2 N$) qubits. The quantum circuits 202a-202d therefore implement a concatenated hash function with N components.

The resulting qubits are then shuffled, such as by shifting them circularly by one-half of the width of the intermediate value for each element. This results in a new sequence of N permuted intermediate values 208. The quantum circuits 202e-202h then apply the same composite hash function to the permuted intermediate values 208, producing a hash output 210 with approximately r possible values for each intermediate value. The quantum circuits 202e-202h again therefore implement a concatenated hash function with N components. The quantum circuit 202e here is shown in divided form to represent the fact that the quantum circuit 202e is receiving half of the qubits from the quantum circuit 202a and half of the qubits from the quantum circuit 202d (due to the shifting used to generate the permuted intermediate values 208).

If the total number of output qubits for the hash function is b, the components of the first concatenated hash function (quantum circuits 202a-202d) each have approximately ($b/N + \log_2 N$) output qubits, and the components of the second concatenated hash function (quantum circuits 202e-202h) each have approximately b/N output qubits. The total number of possible composite hash values for the whole sequence is as close to $r^N$ as possible and includes a total of (N $\log_2$ r) qubits. If the quantum circuit size of the composite hash function is polynomial in the number of input and output bits of degree p, the composite hash function uses a quantum circuit of a size proportional to $N(\log_2 N)^p$ by construction, which is nearly linear.

FIG. 3 contains an example chart 300 illustrating simulation results showing that a composite hash function is sufficiently random to meet the first two requirements discussed above (it is hard for classical computers but easy for quantum computers to solve and its values are substantially equally distributed). In FIG. 3, the chart 300 plots the probability of hitting a random composite hash value as a function of the size of the solution set S. A line 302 represents results obtained using an amplification where N equals 8, a line 304 represents results obtained using an amplification where N equals 16, and a line 306 represents results obtained using an amplification where N equals 32. As can be seen here, with amplification N, the estimation error of the size of S decreases as 1/N. In contrast, using a concatenation of N hash functions (such as only the outputs of the lower level 204a of quantum circuits 202a-202d in FIG. 2) would cause the estimation error to decrease as $1/\sqrt{N}$, which is equivalent to Monte Carlo simulations using classical computing systems.

Any suitable composite hash function could be used in the circuit 200. In some embodiments, the following variation of the Chaum-van Heijst-Pfitzmann hash function could be used. Suppose that p is a large prime number and that $q=(p-1)/2$ is also a prime number. Let $\alpha$ and $\beta$ be two primitive roots of $Z_p^x$. The hash function:

$$h: \{0, \ldots, p-2\} \times \{0, \ldots, q-1\} \rightarrow Z_p^x \qquad (1)$$

can be defined as follows:

$$h(x_1, x_2) = \alpha^{x_1} \beta^{x_2} \bmod p \qquad (2)$$

One difference between the hash function in Equation (2) and the Chaum-van Heijst-Pfitzmann hash function is the domain in which the inputs $x_1$ are allowed to be specified. In practice, the Chaum-van Heijst-Pfitzmann hash function does not uniformly distribute values since it is dependent on the choice of generators. However, if one input is allowed to vary from 0 to p−2, the distribution is nearly uniform since each element of the group can be obtained by the first term alone.

The hash function h in Equation (2) is strongly collision resistant. It can be shown that, if one were to find a hash collision, one would be able to solve a problem that is known to be computationally hard. In this case, it can be shown that finding collisions of the hash function h makes it easy to solve the discrete logarithm problem, which is hard for classical computers. On the other hand, in some embodiments, such as those using gate-model quantum computers, Shor's Algorithm is known to efficiently solve the discrete logarithm problem, making it practical for quantum counting.

In some cases, the hash function h in Equation (2) by itself may not be sufficient, since the size of the input to the hash function can be arbitrarily large. This can be handled in any suitable manner, such as by using the Merkle-Damgård construction. The Merkle-Damgård construction states that if one has a collision-resistant hash function h that maps $A \times B \to A$, a compositional chain $h^N$ of N such functions (resulting in a function $A \times B^N \to A$) will also be collision resistant. In some embodiments, copies of the circuit 200 configured to solve h may be chained together to solve $h^N$.

Although FIGS. 2 and 3 illustrate one example of a technique for computing composite hash values during quantum counting and associated results, various changes may be made to FIGS. 2 and 3. For example, the circuit 200 could include any suitable number and arrangement of quantum circuits 200. Also, the results shown in FIG. 3 are merely example results, and other results could be obtained depending on the implementation.

Figure 4:
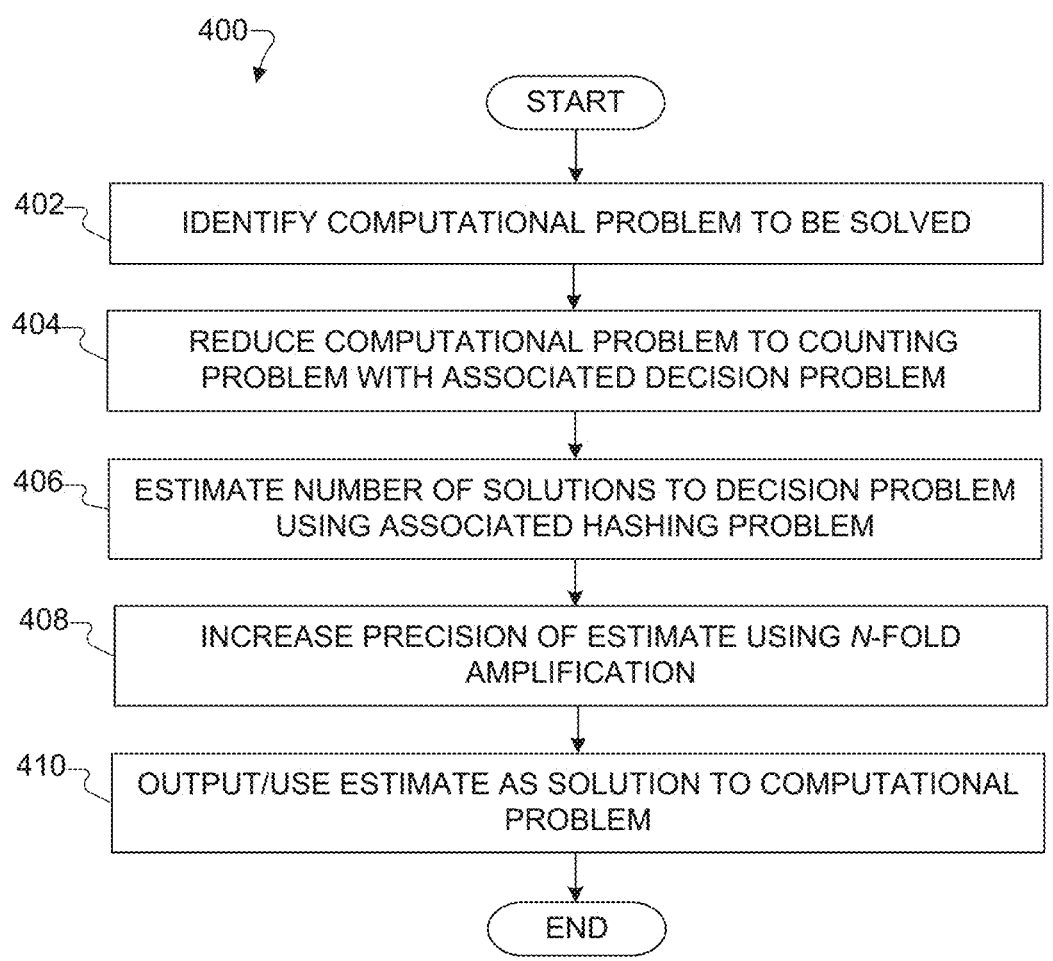
FIG. 4 illustrates an example method for performing fast computations using quantum counting according to this disclosure.

FIG. 4 illustrates an example method 400 for performing fast computations using quantum counting according to this disclosure. For ease of explanation, the method 400 of FIG. 4 is described as being used with the system 100 of FIG. 1 and the circuit 200 of FIG. 2. However, the method 400 could be used with any other suitable device or system.

As shown in FIG. 4, a computational problem to be solved is identified at step 402, and the computational problem is reduced to a counting problem having an associated decision problem at step 404. This could include, for example, identifying a computational problem in the NP class involving an average, integration, volume, or percentile and generating a corresponding counting problem in the #P class. As a particular example, this could involve identifying one of the three classes of problems discussed above (tail, integration, or American integration calculations) and identifying a corresponding counting problem. Note that these steps could be performed manually or in a partially or fully automated manner, such as by using a classical computing system 116.

In some embodiments, the computational problem involves finding a percentile of a function $f(x)$ over a large number of inputs x, and the associated decision problem is to decide whether there is an x such that $f(x) < c$ for a given c. In other embodiments, the computational problem involves finding an average, sum, or integral of a function $f(x)$ over a large number of inputs x, and the associated decision problem is to decide whether there is a pair (x, y) for which $y < f(x)$. In still other embodiments, the computational problem involves finding a conditional expectation p( ) over a large number of inputs $(x_1, \ldots, x_d)$, where $p(x_1, \ldots, x_d) = f(x_1, \ldots, x_d; \text{average}_{x_{d+1}} p(x_1, \ldots, x_{d+1}))$ for some function $f( )$ over truncated inputs $(x_1, \ldots, x_d; a)$. Here, the computational problem is partially reduced to the problem of computing averages of $p(x_1, \ldots, x_{d+1}) p_i(x_1, \ldots, x_d)$ and $p_i(x_1, \ldots, x_d) p_j(x_1, \ldots, x_d)$ over the truncated inputs $(x_1, \ldots, x_{d+1})$, where $p_i$ and $p_j$ denote regression functions.

An estimate of the number of solutions to the decision problem is identified using an associated hashing problem at step 406. This could include, for example, using a quantum computing system 102 in which quantum circuits 202 are arranged to implement a hash function. The quantum computing system 102 uses the quantum circuits 202 to determine if there is a simultaneous solution to the decision problem and the associated hashing problem. For instance, the quantum computing system 102 can determine an estimate of a size of the solution set to the decision problem based on hash hits, namely by using the hash function to look for solutions that match specific hash values. As noted above, the hash function represents a function that can be solved efficiently with a quantum computer but cannot be solved efficiently with a classical computer. In some cases, the hash function uses random salt as part of the hash computations.

In some embodiments, the hash function is based on the discrete logarithm, which could be implemented using a composite hash function via the quantum circuits 202. Also, in some embodiments, the quantum system used with a sequence of N inputs to the decision problem can have a size that is linear or nearly linear in N. In particular embodiments, the quantum circuits 202 are arranged in multiple levels 204a and 204b. The hash function for a sequence of N inputs to the decision problem can be constructed as the composite of a concatenated hash function with N components in the lower level 204a, a permutation (such as a shifting of intermediate values), and another composite of a concatenated hash function with N components in the upper level 204b.

A precision of the estimated number of solutions to the decision problem is increased using N-fold amplification at step 408. This could include, for example, using the quantum computing system 102 to find N elements of the set being counted that achieve the specific hash value. In this way, the quantum computing system 102 can determine if there is a sequence of one or more solutions to the decision problem that are simultaneously one or more solution to the associated hash function.

The estimated count of the solutions to the decision problem is output or used as a solution to the computational problem at step 410. This could include, for example, the quantum computing system 102 or the classical computing system 116 using the (amplified) estimated number of solutions as the solution to the computational problem in the NP class.

As a particular example of using the method 400, assume that in step 402 the computational problem identified involves computing the sum of $f(x)$ over a large number of x, where $f(x)$ takes on non-negative integer values. In step 404, this can be reformulated as counting the number of pairs (x, y) among all values of x and all non-negative integer values of y such that $y < f(x)$. In step 406, let S be the set of pairs (x, y) among all values of x and all non-negative integer values of y such that $y < f(x)$. The set S can be defined as the set of pairs such that the function $s(x, y) = \min(1, f(x) - y)$ takes the value "1." Also, let a hash function $h(x, y)$ take on values in a set R such that (i) the values appear to be random to a classical computer and (ii) a quantum computer can quickly find pairs (x, y) such that $h(x, y) = h_0$ for any chosen $h_0$ in R. Consider the combined function $sh(x, y) = (s(x, y), h(x, y))$. The quantum computing system 102 is used in step 406 to find a simultaneous solution, meaning a pair (x, y) such that $sh(x, y) = (1, h_0)$ for some random choice of $h_0$ in R. This can be performed efficiently because the hash function can be solved quickly on the quantum computer. The probability of such a solution existing is approximately $(1 - \exp(-|S|/|R|))$. Suppose this is done twice with different choices of $h_0$ and results in one hit and one non-hit on a solution. According to Bayes' Law, with a uniform prior distribution on the size of S, the posterior probability distribution for $|S|$ is $(1 - \exp(-|S|/|R|)) \times \exp(-|S|/|R|)$. Choosing the 25th and 75th percentiles of this distribution would provide a 50% confidence interval for $|S|$. In step 408, the previous step (step 406) can be repeated with the product set $S^N = \{s_1, \ldots, s_N : s_i \in S\}$ of N-tuples of the elements of S. Assume that the 50% confidence interval for the size $|S^N| = |S|^N$ of the product set has a width E. This translates into a 50% confidence interval for |S| of width $\epsilon$/N, thus providing linearly amplified convergence.

Although FIG. 4 illustrates one example of a method 400 for performing fast computations using quantum counting, various changes may be made to FIG. 4. For example, while shown as a series of steps, various steps in FIG. 4 could overlap, occur in parallel, or occur any number of times. Also, the method 400 could be performed using a quantum computing system that includes at least one quantum circuit configured to perform quantum counting. Other operations may or may not be performed by the quantum computing system, such as when certain functions are performed by a classical computing system that interacts with the quantum computing system via an input control device 112 and a readout control device 114.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for solving a computational problem that is reducible to a problem of counting solutions to an associated decision problem, the method comprising:
   using a quantum computer, estimating a number of the solutions to the decision problem by determining if there is at least one simultaneous solution to both (i) the decision problem and (ii) an associated hashing problem;
   using the quantum computer, increasing a precision of the estimated number of the solutions to the decision problem by determining if there are multiple solutions to the decision problem that are simultaneously solutions to the associated hashing problem; and
   outputting or using the estimated number of the solutions to the decision problem as a solution to the computational problem;
   wherein the hashing problem is associated with a hash function; and
   wherein each solution to the hashing problem denotes a solution that obtains a specified random hash value from the hash function.

2. The method of claim 1, wherein the hash function uses a random salt as part of hash computations.

3. The method of claim 1, wherein the hash function is based on the discrete logarithm.

4. The method of claim 1, wherein the associated hashing problem is solved efficiently with the quantum computer but cannot be solved efficiently with a classical computer.

5. The method of claim 1, wherein:
   the computational problem involves finding a percentile of a specified function $f(x)$ over inputs x; and
   the associated decision problem involves deciding whether there is an input x such that $f(x)<c$ for a given value of c.

6. The method of claim 1, wherein:
   the computational problem involves finding an average, sum, or integral of a specified function $f(x)$ over inputs x; and
   the associated decision problem involves deciding whether there is a pair (x, y) for which $y<f(x)$.

7. The method of claim 1, wherein:
   the computational problem involves finding a conditional expectation p( ) over inputs $(x_1, \ldots, x_d)$, where $p(x_1, \ldots, x_d) = f(x_1, \ldots, x_d; \text{average}_{x_{d+1}} p(x_1, \ldots, x_{d+1}))$ for a specified function $f( )$ over truncated inputs $(x_1, \ldots, x_d; a)$; and
   the associated decision problem involves computing averages of $p(x_1, \ldots, x_{d+1}) p_i(x_1, \ldots, x_d)$ and $p_i(x_1, \ldots, x_d) p_j(x_1, \ldots, x_d)$ over the truncated inputs $(x_1, \ldots, x_{d+1})$, where $p_i$ and $p_j$ are regression functions.

8. The method of claim 1, wherein the associated hashing problem is solvable for a sequence of N inputs using a quantum circuit having a size that is linear or approximately linear in N.

9. The method of claim 1, wherein the hash function for a sequence of N inputs is constructed in the quantum computer as a first concatenated hash function with N first components, a permutation, and a second concatenated hash function with N second components.

10. The method of claim 9, wherein:
a total number of output qubits for the hash function is b;
each of the first components of the first concatenated hash function has approximately $(b/N + \log_2 N)$ output qubits; and
each of the second components of the second concatenated hash function has approximately b/N output qubits.

11. An apparatus comprising:
a quantum computer comprising at least one quantum circuit;
wherein, to solve a computational problem that is reducible to a problem of counting solutions to an associated decision problem, the quantum computer is configured to:
   determine, using the at least one quantum circuit, if there is at least one simultaneous solution to both (i) the decision problem and (ii) an associated hashing problem in order to estimate a number of the solutions to the decision problem; and
   determine, using the at least one quantum circuit, if there are multiple solutions to the decision problem that are simultaneously solutions to the associated hashing problem in order to increase a precision of the estimated number of the solutions to the decision problem;
wherein the estimated number of the solutions to the decision problem represents a solution to the computational problem;
wherein the hashing problem is associated with a hash function; and
wherein each solution to the hashing problem denotes a solution that obtains a specified random hash value from the hash function.

12. The apparatus of claim 11, wherein the hash function uses a random salt as part of hash computations.

13. The apparatus of claim 11, wherein the associated hashing problem is solved efficiently with the quantum computer but cannot be solved efficiently with a classical computer.

14. The apparatus of claim 11, wherein:
the computational problem involves finding a percentile of a specified function $f(x)$ over inputs x; and
the associated decision problem involves deciding whether there is an input x such that $f(x)<c$ for a given value of c.

15. The apparatus of claim 11, wherein:
the computational problem involves finding an average, sum, or integral of a specified function $f(x)$ over inputs x; and
the associated decision problem involves deciding whether there is a pair (x, y) for which $y<f(x)$.

16. The apparatus of claim 11, wherein:
the computational problem involves finding a conditional expectation p( ) over inputs $(x_1, \ldots, x_d)$, where $p(x_1, \ldots, x_d) = f(x_1, \ldots, x_d; \text{average}_{x_{d+1}} p(x_1, \ldots, x_{d+1}))$ for a specified function $f( )$ over truncated inputs $(x_1, \ldots, x_d; a)$; and
the associated decision problem involves computing averages of $p(x_1, \ldots, x_{d+1}) p_i(x_1, \ldots, x_d)$ and $p_j(x_1, \ldots, x_d)$ over the truncated inputs $(x_1, \ldots, x_{d+1})$, where $p_i$ and $p_j$ are regression functions.

17. The apparatus of claim 11, wherein the at least one quantum circuit comprises:
a first level of quantum circuits configured to implement a first concatenated hash function using N inputs; and
a second level of quantum circuits configured to implement a second concatenated hash function that operates on a permutation of outputs of the first level of quantum circuits.

18. The apparatus of claim 17, wherein:
a total number of output qubits for the hash function is b;
each of the quantum circuits in the first level has approximately $(b/N + \log_2 N)$ output qubits; and
each of the quantum circuits in the second level has approximately b/N output qubits.

19. The apparatus of claim 11, wherein:
the associated decision problem comprises a non-deterministic polynomial time (NP) class problem; and
the problem of counting the solutions to the associated decision problem comprises a #P class problem.

20. A system comprising:
a quantum computer comprising at least one quantum circuit; and
a classical computer comprising at least one processor configured to execute instructions stored in at least one memory;
wherein, to solve a computational problem that is reducible to a problem of counting solutions to an associated decision problem, the classical computer is configured to use the quantum computer to:
   estimate a number of the solutions to the decision problem by determining if there is at least one simultaneous solution to both (i) the decision problem and (ii) an associated hashing problem; and
   increase a precision of the estimated number of the solutions to the decision problem by determining if there are multiple solutions to the decision problem that are simultaneously solutions to the associated hashing problem;
wherein the estimated number of the solutions to the decision problem represents a solution to the computational problem;
wherein the hashing problem is associated with a hash function; and
wherein each solution to the hashing problem denotes a solution that obtains a specified random hash value from the hash function.

* * * * *